(12) United States Patent
Jang et al.

(10) Patent No.: US 9,006,930 B2
(45) Date of Patent: Apr. 14, 2015

(54) POWER SUPPLY HAVING CONVERTERS WITH SERIALLY CONNECTED INPUTS AND PARALLEL CONNECTED OUTPUTS

(75) Inventors: Yungtaek Jang, Cary, NC (US); Milan Jovanovic, Cary, NC (US); Sheng-Hua Li, Chungli (TW); Chia-Cheng Yang, Chungli (TW)

(73) Assignee: Delta Electronics Inc., Taipei (TW)

( * ) Notice: Subject to any disclaimer, the term of this patent is extended or adjusted under 35 U.S.C. 154(b) by 917 days.

(21) Appl. No.: 12/832,477

(22) Filed: Jul. 8, 2010

(65) Prior Publication Data

US 2012/0007431 A1    Jan. 12, 2012

(51) Int. Cl.
*H02J 4/00* (2006.01)
*H02M 1/00* (2006.01)

(52) U.S. Cl.
CPC .......... *H02J 4/00* (2013.01); *H02M 2001/0074* (2013.01)

(58) Field of Classification Search
CPC .............................................. H02M 2001/0074
USPC ................................................. 307/54, 61, 78
See application file for complete search history.

(56) References Cited

U.S. PATENT DOCUMENTS

| | | | |
|---|---|---|---|
| 3,792,286 A * | 2/1974 | Meier | 307/58 |
| 3,818,307 A * | 6/1974 | Hamilton et al. | 363/25 |
| 3,906,333 A * | 9/1975 | Kalmanash | 323/259 |
| 4,062,057 A * | 12/1977 | Perkins et al. | 363/71 |
| 4,347,558 A | 8/1982 | Kalinsky | |
| 5,229,928 A | 7/1993 | Karlsson et al. | |
| 5,666,278 A * | 9/1997 | Ng et al. | 363/71 |
| 6,396,170 B1 * | 5/2002 | Laufenberg et al. | 307/64 |
| 6,680,856 B2 * | 1/2004 | Schreiber | 363/71 |
| 7,872,886 B2 * | 1/2011 | Xu et al. | 363/65 |
| 8,106,538 B2 * | 1/2012 | Kunow et al. | 307/82 |
| 2004/0262998 A1 * | 12/2004 | Kunow et al. | 307/140 |
| 2008/0054726 A1 * | 3/2008 | Chang et al. | 307/82 |
| 2008/0143188 A1 * | 6/2008 | Adest et al. | 307/82 |
| 2009/0289502 A1 * | 11/2009 | Batarseh et al. | 307/44 |
| 2010/0007221 A1 | 1/2010 | Ye et al. | |
| 2011/0018354 A1 * | 1/2011 | Liu | 307/82 |
| 2012/0038217 A1 * | 2/2012 | Egiziano et al. | 307/82 |

OTHER PUBLICATIONS

Ayyanar, Raja, et al., "Active Input—Voltage and Load—Current Sharing in Input-Series and Output—Parallel Connected Modular DC-DC Converters Using Dynamic Input—Voltage Reference Scheme", IEEE Transactions on Power Electronics, vol. 19, No. 6, pp. 1462-1473, Nov. 2004.

(Continued)

*Primary Examiner* — Fritz M Fleming
(74) *Attorney, Agent, or Firm* — Vector IP Law Group; Robert S. Babayi

(57) ABSTRACT

A power supply is coupled to an input voltage source. The power supply includes a plurality of converters. Each converter has an input for receiving an input voltage and an output for providing an output voltage. The inputs are connected in series and the outputs are connected in parallel to provide an output voltage. The power supply further includes an output regulating controller coupled to one of the plurality of converters for regulating the output voltage. The power supply further includes one or more input regulating controllers correspondingly coupled to the remaining one or more converters of the plurality of converters for regulating one or more input voltages.

21 Claims, 12 Drawing Sheets

(56) References Cited

OTHER PUBLICATIONS

Giri, Ramesh et al., "Common-Duty—Ratio Control of Input—Series Connected Modular DC-DC Converters With Active Input Voltage and Load—Current Sharing", IEEE Transactions on Industry Applications, vol. 42, No. 4, pp. 1101-1111, Jul./Aug. 2006.

Grobovic, Petar J., "Master/Slave Control of Input—Series- and Output—Parallel-Connected Converters: Concept for Low-Cost High—Voltage Auxiliary Power Supplies", IEEE Transactions on Power Electronics, vol. 24, No. 2, pp. 316-328, Feb. 2009.

Kim et al., Modeling, Control, and Design of Input-Series-Output Parallel—Connected Converter for High-Speed—Train Power System, IEEE Transactions on Industrial Electronics, vol. 48, No. 3, pp. 536-544, 2001.

ERTL et al., Active Voltage Balancing of DC-Link Electrolytic Capacitors, IET Power Electron, vol. 1, No. 4, pp. 488-496, 2008.

Iman-Eini et al., A Modular Strategy for Control and Voltage Balancing of Cascaded H-Bridge Rectifiers, IEEE Transactions on Power Electronics, vol. 23, No. 5, pp. 2428-2442, Sep. 2008.

Sano et al., A Resonant Switched-Capacitor Converter for Voltage Balancing of Series-Connected Capacitors, pp. 683-688, PEDS2009.

Lee et al., Input Series-Output-Parallel Connected DC/DC Converter for a Photovoltaic PCS With High Efficiency Under a Wide Load Range, Journal of Power Electronics, vol. 10, No. 1, pp. 9-13, Jan. 2010.

* cited by examiner

POWER SUPPLY HAVING CONVERTERS WITH SERIALLY CONNECTED INPUTS AND PARALLEL CONNECTED OUTPUTS

FIELD OF THE INVENTION

The present invention generally relates to the field of power supplies and more particularly, to balancing of the input-voltages of power converters that have their inputs connected in series and their outputs in parallel.

BACKGROUND

In many applications, instead of using a single power converter, a number of power converters with a lower power rating are employed to bring about performance improvements and/or reduce the cost. For example, paralleling of power converters is a widely used approach in today's high-efficiency, high-power density applications since it makes possible to implement redundancy, as well as to improve partial-load efficiency by employing power management. Similarly, in applications with a relatively high input voltage, instead of a single converter, a number of converters are used by connecting their inputs in series and their outputs in parallel. Series connection of converters' inputs makes possible to use converters designed with lower-voltage-rated components, which are typically more efficient and less expensive than their high-voltage-rated counterparts.

As an example, FIG. 1 shows a prior art method of two converters with their inputs connected in series and outputs in parallel. In applications where a front end provides voltage to downstream dc/dc converters, for example in ac/dc applications, the inputs of the converters are directly coupled to energy-storage capacitors of the front end, as illustrated in FIG. 1. In the connection of the converters in FIG. 1, the balance of the input voltages i.e., the balance of the capacitor voltages, can only be maintained if the converters are identical and capacitors $C_1$ and $C_2$ have same characteristics. Otherwise, the input voltages of the two converters will be different depending on the mismatching of the two converters and capacitors.

Generally, an input voltage imbalance that does not produce excessive stresses on the converter's components can be tolerated. However, to prevent the input-voltage imbalance from exceeding a permissible range, a voltage-balancing control must be implemented in the circuit in FIG. 1.

FIG. 2 shows a prior art voltage balancing method. The simplest voltage balancing method is to connect resistor R across capacitors $C_1$ and $C_2$, i.e., across the inputs of each converter, as shown in FIG. 2. While this method is effective in balancing capacitors voltages due to a typical mismatching of the capacitor impedances, its effectiveness in balancing voltages due to a mismatching of the converters is very limited. Namely, to balance the input voltages of mismatched converters, the difference of the input currents of the converters $\Delta I_{IN} = I_{IN1} - I_{IN2}$ must be taken by the resistors R. As this difference is increasing as the mismatching of the converters increases, the value of resistors R must be decreased. A decreased value of resistance leads to an increased power loss on these resistors which adversely affects the conversion efficiency. As a result the resistor voltage-balancing method shown in FIG. 2 is only suitable for balancing of the capacitor impedances and a very small input-current mismatching of the converters.

FIG. 3 shows another prior art input-voltage balancing method. This active input-voltage balancing method is implemented with a totem-pole switch configuration operated at a 50% duty cycle and an inductor connected between the mid points of the switches and capacitors. Since with 50% duty cycle, the mid voltage of switches $V_S$ is exactly one-half of the total capacitor voltage (input voltage) $V_{IN}$, i.e., $V_S = V_{IN}/2$, the capacitor mid-point voltage $V_M$ is also equal to $V_{IN}/2$ since average inductor voltage is zero. As a result, the voltage balancing circuit ensures excellent balancing and can handle a relatively large mismatching of converters' input currents effectively. The major drawback of the circuit is that it requires additional power components which decreases the efficiency and power density and increases the cost.

FIG. 4 shows yet another prior art input-voltage balancing method. In this method, voltage balancing is implemented solely at the control level, i.e., without addition of any components in the power circuit. As a result, this method offers voltage balancing without adversely affecting, the efficiency, power density, or cost. The approach in FIG. 4 achieves input-voltage balancing by directly regulating input voltage of the converters. Specifically, in this method a controller is used to regulate the input and output voltage of each converter. As illustrated in FIG. 4, for each converter the input and output voltage are sensed and the sensed voltages are brought to the controller. Because the control variable in each of the converter has to simultaneously regulate the input and the output voltage, a simultaneous tight regulation of both is not possible. Since in a majority of applications the output has to be tightly regulated, the input voltage balancing of this method is relatively poor. Since in this method the input voltages are not tightly matched, this method also requires load current-sharing control to ensure that each converter delivers approximately the same amount of the load currents.

Therefore, there exists a need for input-voltage balancing of power converters that have inputs connected in series and outputs connected in parallel without the limitations of prior-art techniques.

SUMMARY

Briefly, according to one embodiment of the present invention, a power supply is coupled to an input voltage source. The power supply includes a plurality of converters. Each converter has an input for receiving an input voltage and an output for providing an output voltage. The inputs are connected in series and the outputs are connected in parallel to provide an output voltage. The power supply further includes an output regulating controller coupled to one of the plurality of converters for regulating the output voltage. The power supply further includes one or more input regulating controllers correspondingly coupled to the remaining one or more converters of the plurality of converters for regulating one or more input voltages.

According to some of the more detailed features of the invention, the input voltage source comprises at least one of an alternating current (AC) voltage source or a direct current (DC) voltage source. The output voltage regulating controller regulates the output voltage relative to an output reference voltage. The one or more input voltage regulating controllers regulate the input voltage of their respective converter relative to a corresponding input reference voltage.

According to other more detailed features of the invention, the input reference voltages are substantially equal and the input voltages are substantially equal. In one embodiment, the input reference voltages are provided by a voltage divider. The voltage divider comprises a plurality of series coupled resistors. In another embodiment, the input reference voltages are provided by a digital circuit.

According to still other more detailed features of the invention, the one or more input voltage regulating controllers are responsive to a change in the output voltage. In an embodiment, the power supply further includes a delay circuit that delays start-up operation of the converter coupled to the output voltage regulating controller relative to the start-up operation of the remaining converters coupled to the one or more input voltage regulating controllers.

According to another embodiment of the present invention, a power supply includes a plurality of converters. Each converter has an input for receiving an input voltage and an output for providing an output voltage. The inputs are connected in series and the outputs are connected in parallel to provide an output voltage. The power supply further includes an output regulating controller coupled to one of the plurality of converters for regulating the output voltage. The power supply further includes one or more input regulating controllers correspondingly coupled to the remaining one or more converters of the plurality of converters for regulating one or more input voltages. The power supply further includes an output voltage detector that detects a change in the output voltage coupled to the one or more input regulating controllers.

According to some of the more detailed features of the invention, the at least one of the one or more input regulating controllers coupled to the output voltage detector regulates corresponding input voltage based on a detected change in the output voltage.

According to yet another embodiment of the present invention, a power supply includes a first power conversion stage providing an interim voltage and a second power stage coupled to the interim voltage. The second power stage includes a plurality of converters, each converter having an input for receiving an input voltage and an output for providing an output voltage. The inputs are connected in series and the outputs are connected in parallel to provide an output voltage. The second power stage further includes an output regulating controller coupled to one of the plurality of converters for regulating the output voltage. The second power stage further includes one or more input regulating controllers correspondingly coupled to the remaining one or more converters of the plurality of converters for regulating one or more input voltages.

According to some of the more detailed features of the invention, the first power conversion stage includes a power factor correction stage, a battery, a solar cell, a generator, a fuel cell, a flywheel, a DC-DC stage, a single phase or three phase AC-single phase or three phase AC stage, a DC-single phase or three phase AC stage, or a single phase or three phase AC-DC stage.

DETAILED DESCRIPTION OF THE INVENTION

Figure 9:
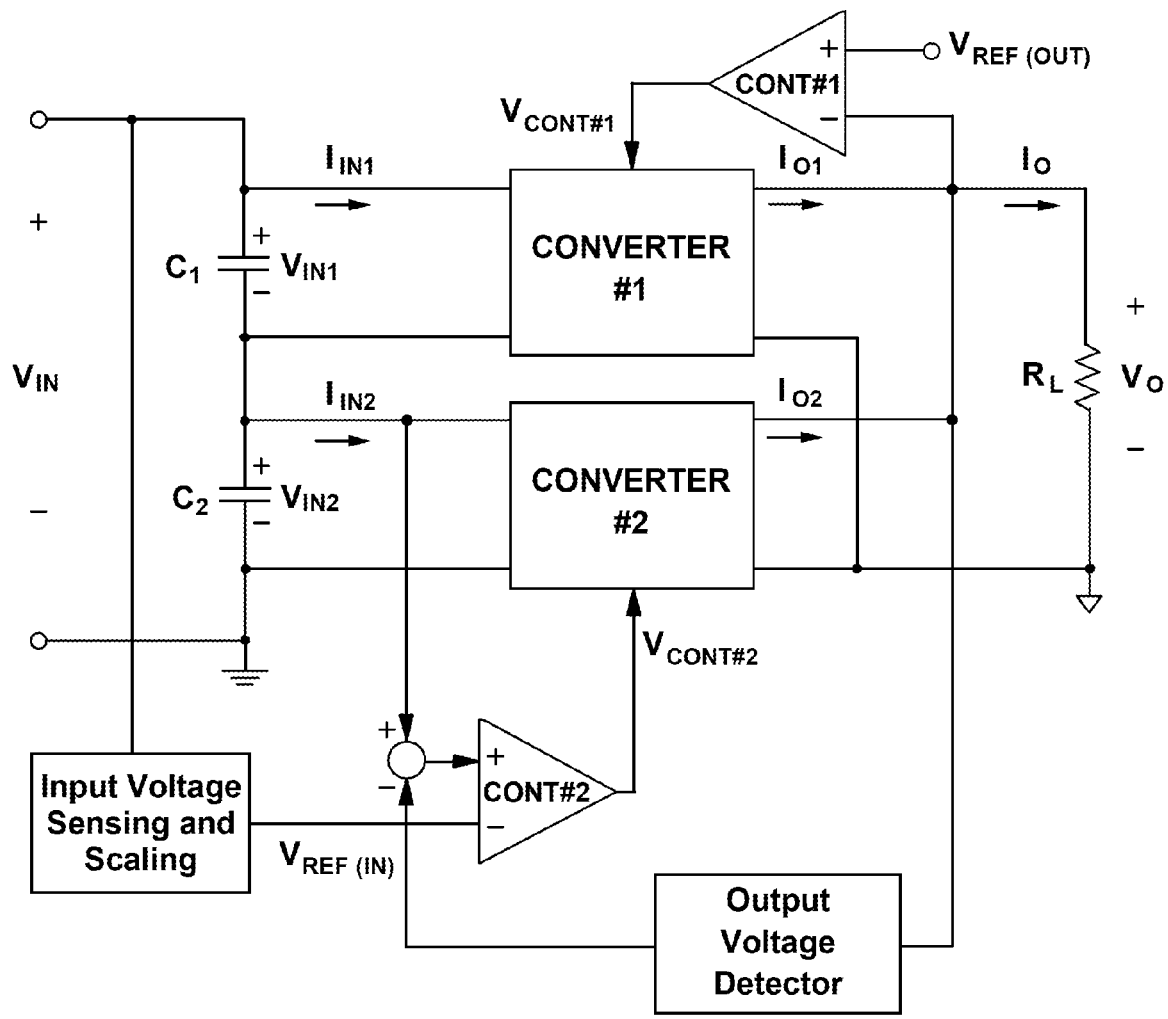
FIG. 9 shows a block diagram of input-voltage balancing with an output voltage detector according to an embodiment of the present invention.

The present invention relates to input-voltage balancing converters that have their inputs connected in series and their outputs in parallel. The balancing of input voltages of the converters are maintained by directly controlling the input and output voltages. However, different from the known methods, the disclosed method independently controls the input and output voltages. Specifically, input-voltage balancing of a plurality of the converters with their inputs connected in series and the outputs in parallel is achieved by using the voltage control loop of one converter to regulate the output voltage and by using the voltage control loop in the remaining converters to regulate their respective input voltages. Therefore, in this method, a tight regulation of both the input voltages and the output voltage can be achieved. Moreover, because of tight regulation of both the input and output voltages, the current sharing of the load current is maintained automatically, i.e., without a need for a current share control of any kind. The current sharing performance is solely dependent on the mismatching of the converters characteristics. Finally, since the method does not require any additional power components, the disclosed method does not affect the efficiency, power density, and cost. Also, as shown in FIG. 9, the control signals that regulate the input voltages can also be made responsive to output voltage changes by coupling a signal representative of output voltage changes into the input-voltage loop to improve the input-voltage balancing during load transients.

The disclosed method is applicable to any power conversion circuit. Specifically, the method is applicable to isolated and non-isolated, single-stage and multi-stage, "hard"-switched, "soft"-switched, quasi-resonant, and resonant converters employed in AC/DC, DC/DC, DC/AC, and AC/AC power supplies.

Figure 1:
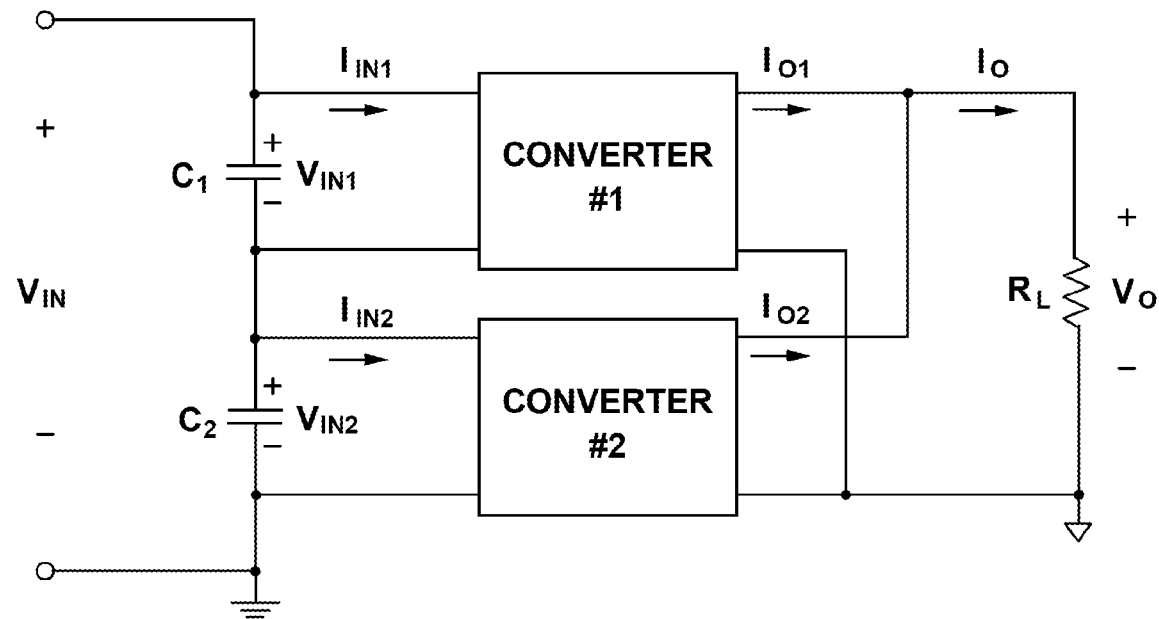
FIG. 1 shows a block diagram of prior art of two converters that have their inputs connected in series and outputs in parallel.
Figure 2:
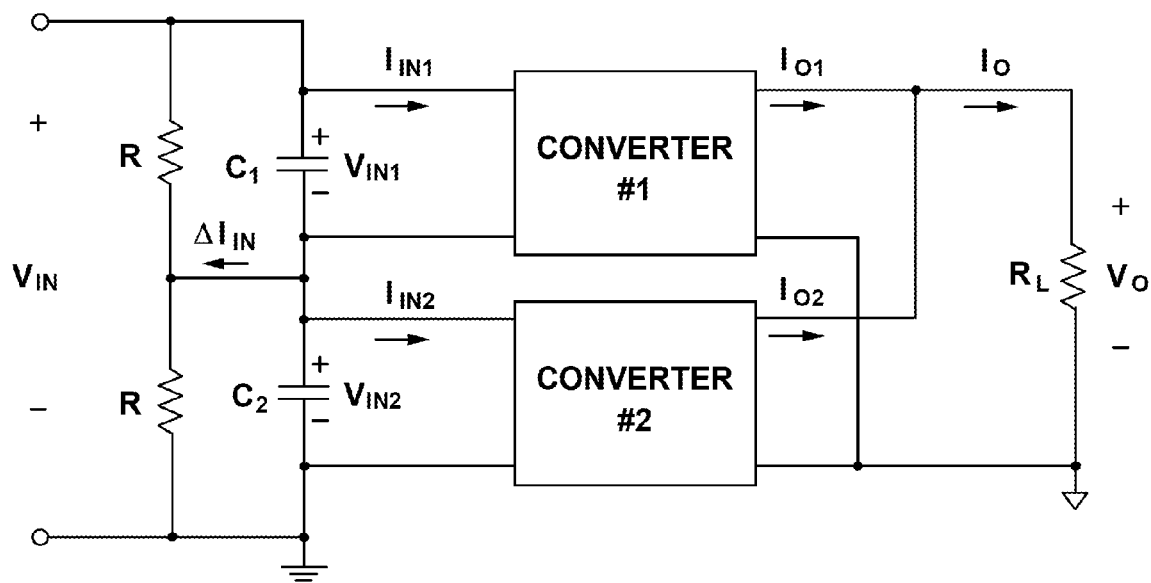
FIG. 2 shows a block diagram of a prior art input-voltage balancing circuit that consists of a resistor connected across the input of each of the converter.
Figure 3:
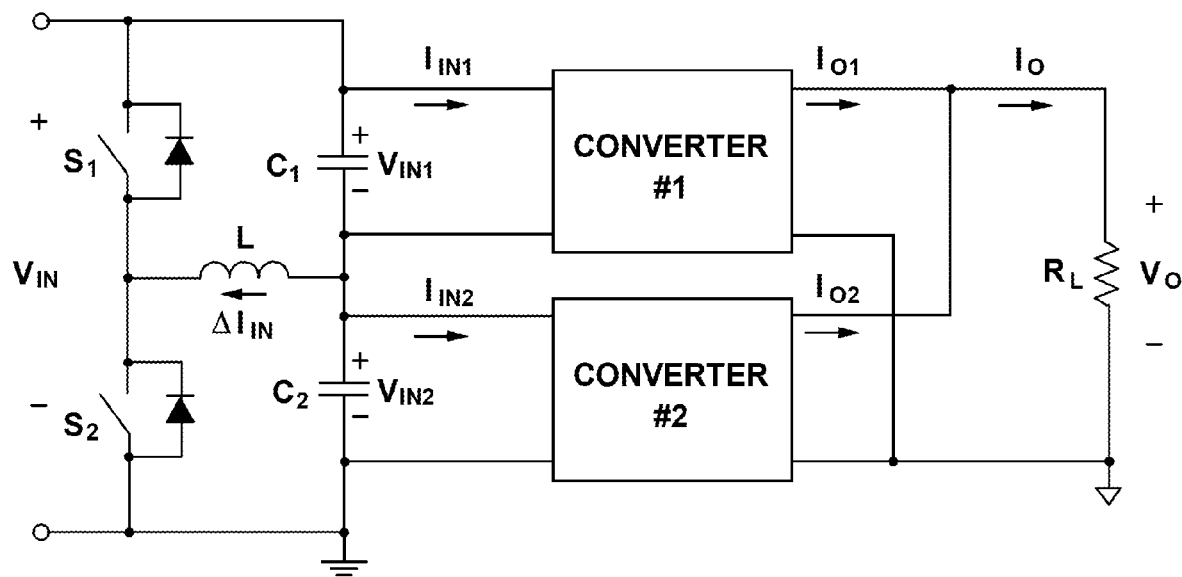
FIG. 3 shows a block diagram of a prior art active input-voltage balancing circuit that consists of a totem-pole switch and an inductor.
Figure 4:
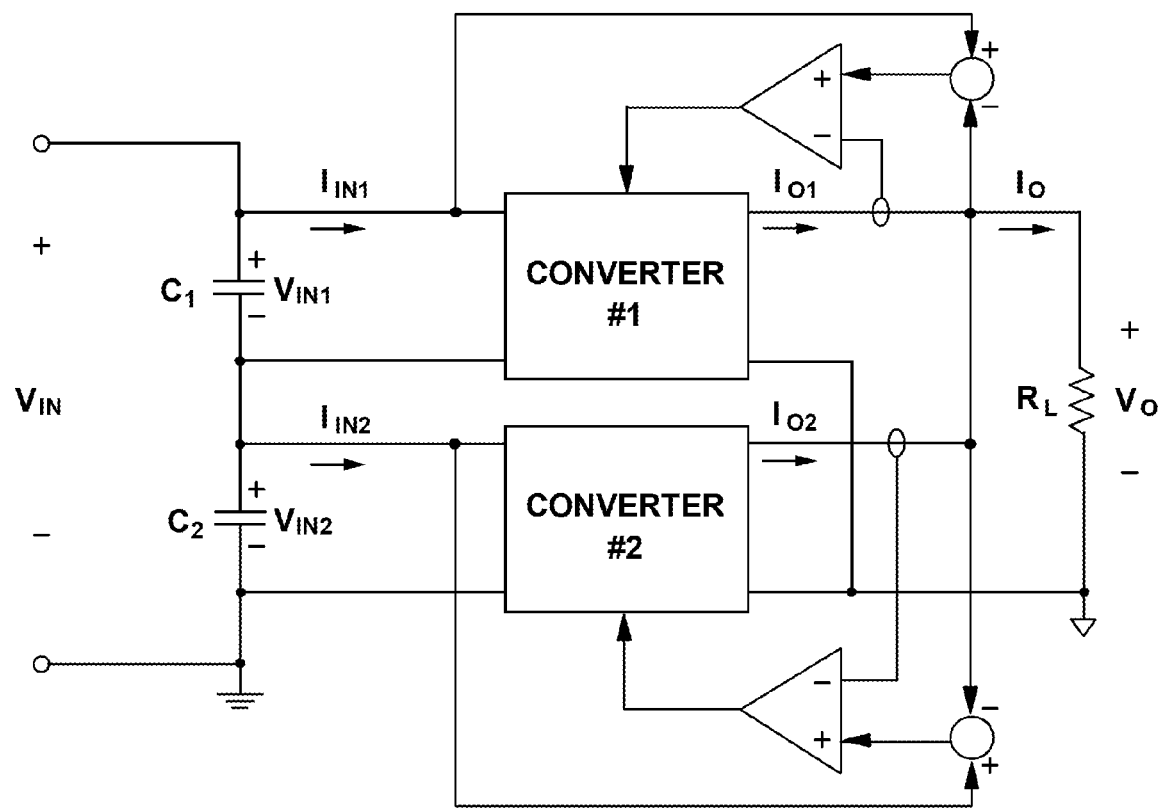
FIG. 4 shows a block diagram of a prior art active input-voltage balancing method that employs closed-loop control of the input voltages.
Figure 5:
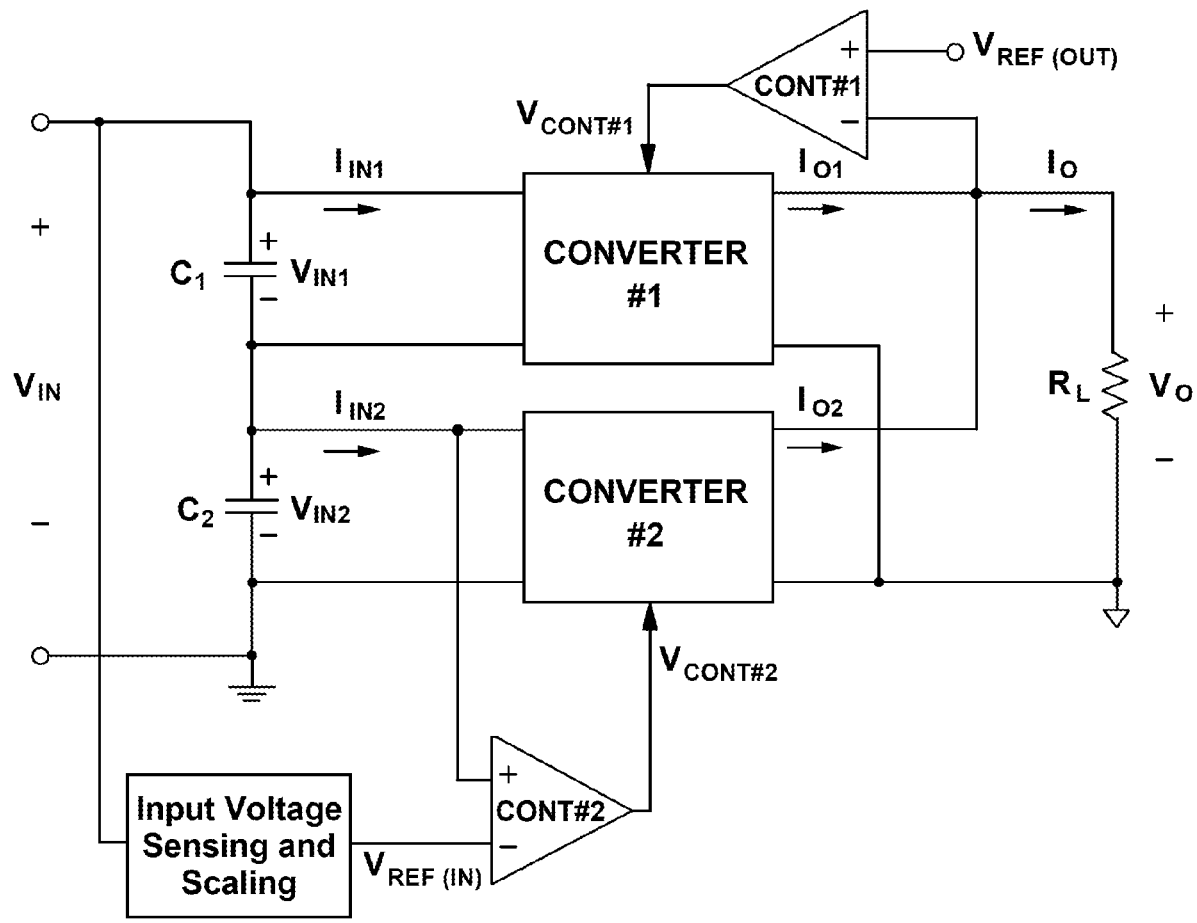
FIG. 5 shows a block diagram of input-voltage balancing according to an embodiment of the present invention.

FIG. 5 shows a block diagram of an embodiment of the present invention that balances input-voltages of a plurality of converters, two converters in this embodiment, each converter having an input for receiving an input voltage and an output for providing an output voltage. A power supply that is coupled to an input voltage source includes the converters. An input voltage source comprises at least one of an alternating current (AC) voltage source or a direct current (DC) voltage source. An output voltage comprises at least one of AC voltage or DC voltage.

The inputs of the converters are connected in series and the outputs are connected in parallel. As shown in FIG. 5, one converter is controlled to regulate the output voltage, whereas the other converter is controlled to regulate its input voltage. An output regulating controller is coupled to one of the plurality of converters for regulating the output voltage and one or more input regulating controllers are correspondingly coupled to the remaining one or more converters of the plurality of converters for regulating one or more input voltages. Specifically in FIG. 5, voltage controller CONT#1 of CONVERTER#1 is an output regulating controller that regulates the output voltage, whereas voltage controller CONT#2 of CONVERTER#2 is an input regulating controller that regulates the input voltage of CONVERTER#2.

The output voltage regulating controller regulates the output voltage relative to an output reference voltage. More specifically, the output voltage regulation is achieved by comparing output voltage $V_O$ with desired reference voltage $V_{REF(out)}$, output reference voltage, and by processing the error with controller CONT#1 to adjust the control variable of CONVERTER#1 so that the converter's output voltage assumes the desired value. Similarly, the one or more input voltage regulating controllers regulate the input voltage of their respective converter relative to a corresponding input reference voltage. More specifically, in FIG. 5 the input voltage control of CONVERTER#2 is regulated by comparing its input voltage $V_{C2}$ with desired reference voltage $V_{REF(in)}$, input reference voltage, derived from the input-voltage sensing and scaling network, for example a digital circuit, and by processing the error with controller CONT#2 so that the control variable of CONVERTER#2 is adjusted to a value necessary to produce the desired input voltage.

Figure 6:
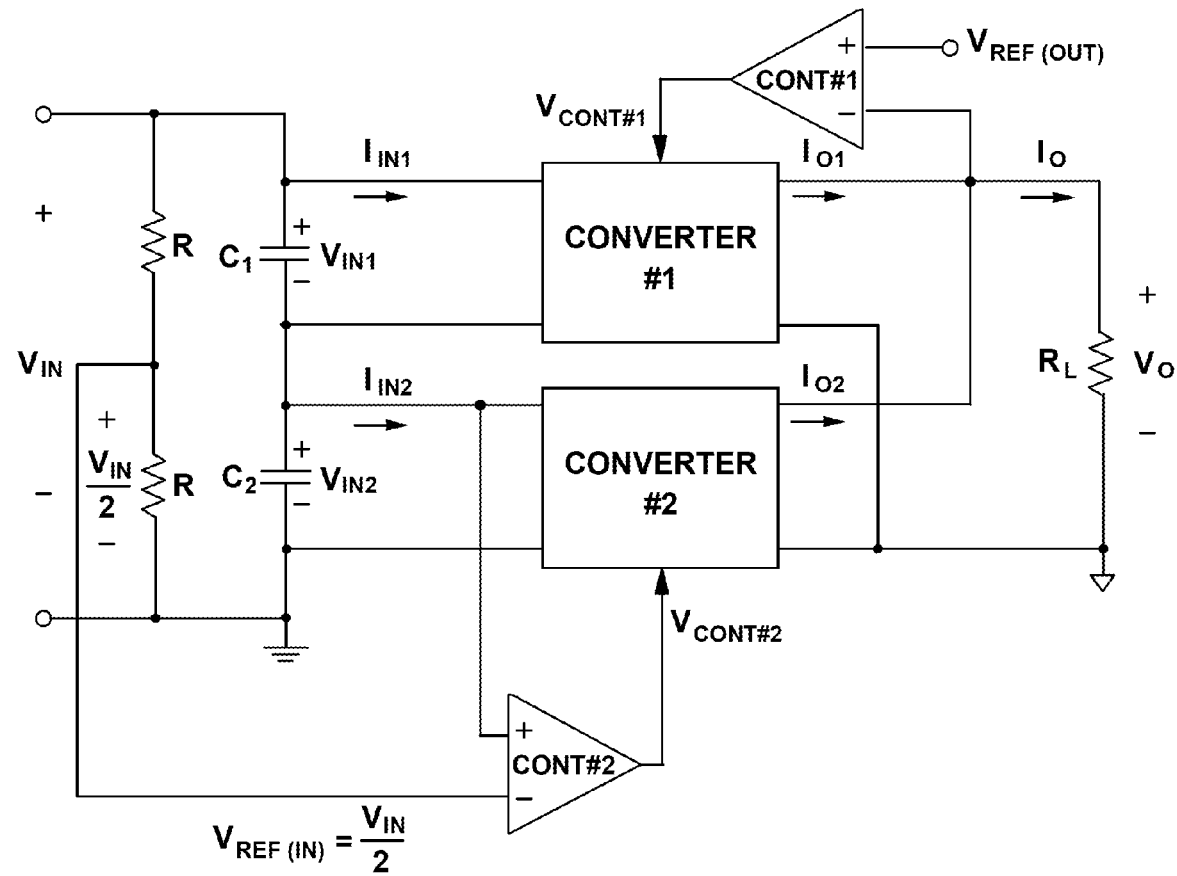
FIG. 6 shows a block diagram of input-voltage balancing with an input voltage divider for setting the reference voltage for a controller that regulates input voltage, according to an embodiment of the present invention.

FIG. 6 shows a block diagram of input-voltage balancing with an input voltage divider for setting the reference voltage for a controller that regulates input voltage. The input reference voltages are provided by the voltage divider. In FIG. 6, the voltage divider is a plurality of series coupled resistors. The input reference voltages can be substantially equal, as can the input voltages. By making reference voltage $V_{REF(in)} = V_{IN}/2$, i.e., by using two identical resistors to split the input voltage, the two converters will have a perfectly balanced input voltages. Alternatively, the input reference voltages can be provided by a digital circuit.

Additionally, because with the voltage-balancing circuit of this embodiment the two converters have identical input voltages and the same output voltage, the load current sharing between the converters is automatically achieved, i.e., no separate current sharing circuit/control is necessary. If the characteristics of both converters are identical, the current sharing is perfect. Otherwise, the load current sharing depends on the mismatching of the converters' characteristics. Typically, this mismatching primarily caused by component tolerances is small.

Figure 7:
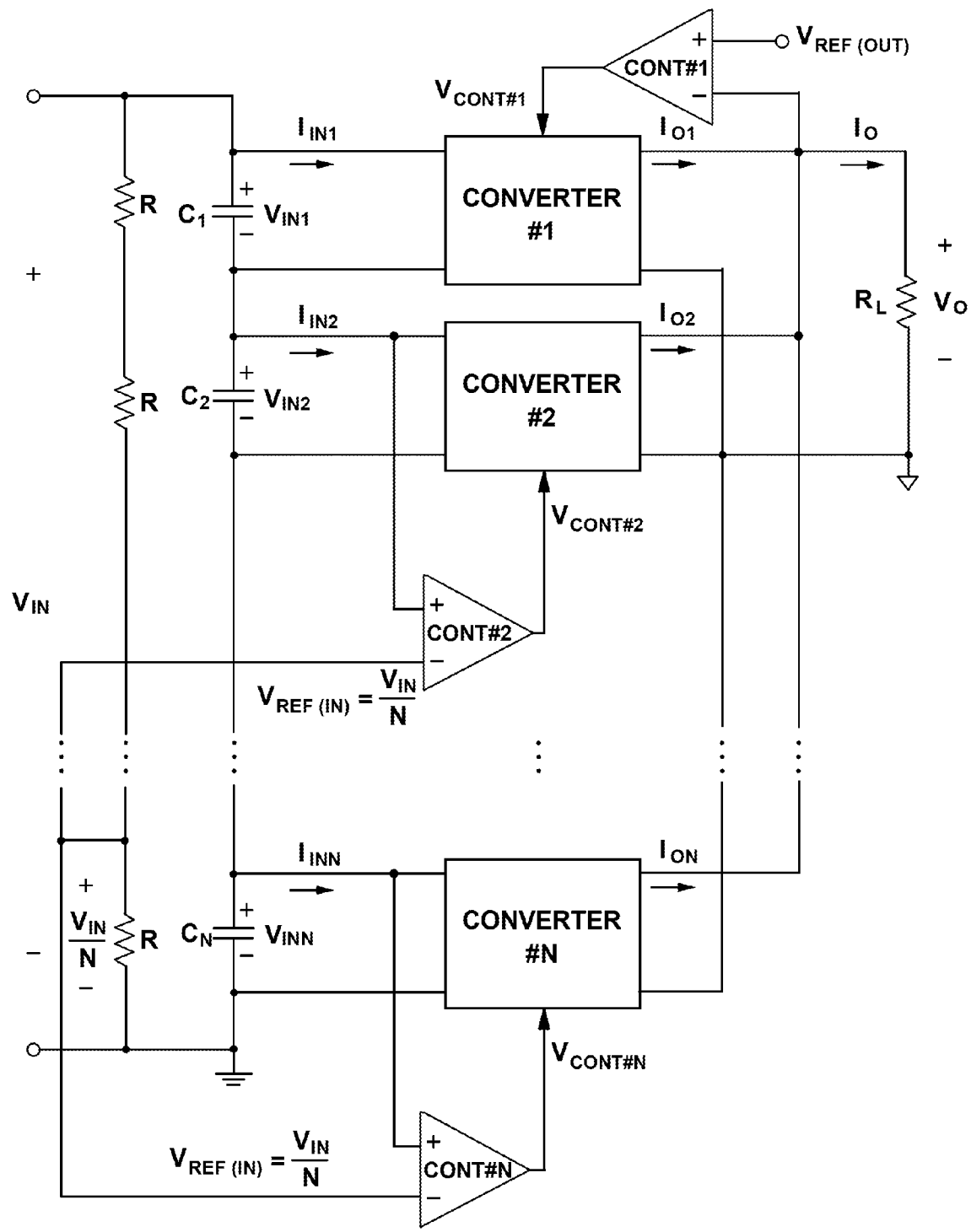
FIG. 7 shows a generalization of a block diagram of input-voltage balancing with N converters that have their inputs connected in series, according to an embodiment of the present invention.

The concept of the present invention can be extended to any number of converters with their inputs connected in series and outputs in parallel. As illustrated in FIG. 7, for N converters that have their inputs connected in series and the outputs in parallel, one converter is employed to regulate the output voltage, whereas the remaining converters are used to regulate their respective input voltages.

Figure 8:
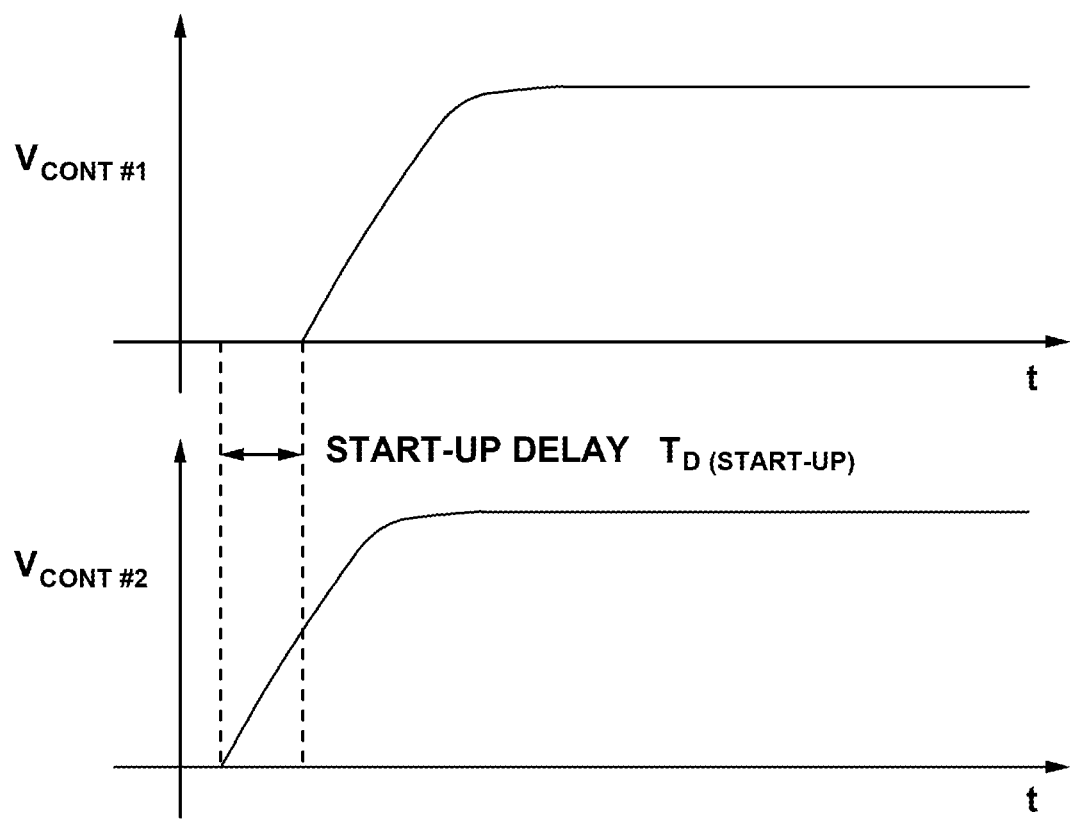
FIG. 8 shows a time graph of a start-up sequence of the two converters as shown in FIG. 5, according to an embodiment of the present invention.

A time graph of a start-up sequence for the two converters in FIG. 5 is shown in FIG. 8. To maintain the input-voltage balancing of converters with the inputs connected in series and outputs in parallel, all converters should start up simultaneously. However, in practice a perfectly synchronized start-up is impossible. Consequently, the converters regulating their input voltages should be designed to start up a short time prior to the startup of the converter that regulates the output voltage. Accordingly, the start-up delay of the output-voltage regulating converter should be as short as possible to minimize input-voltage unbalances during the start-up. A power supply implementing the start-up delay includes a delay circuit that delays start-up operation of the converter coupled to the output voltage regulating controller relative to the start-up operation of the remaining converters coupled to the one or more input voltage regulating controllers.

FIG. 9 shows a block diagram of input-voltage balancing with an output voltage detector according to an embodiment of the present invention. To improve the output-voltage transient response of the input-voltage balancing method of this invention with respect to step load-current changes, a signal representative of output voltage transients is coupled to the input of the controller(s) that regulates the input voltage(s), as shown in FIG. 9 for the case of two converters. The one or more input voltage regulating controllers are responsive to a change in the output voltage based on the signal. In FIG. 9, an output voltage detector detects a change in the output voltage coupled to the one or more input regulating controllers. At least one of the one or more input regulating controllers coupled to the output voltage detector regulates corresponding input voltage based on a detected change in the output voltage. The output voltage detector used to sense and process the output voltage transients is inactive during a steady-state operation, i.e., in steady state output voltage is not coupled to the controller that regulates the input voltage. The coupling exists only when there is a substantial change in the output voltage and the output voltage detector becomes active.

With the output voltage detector, both controller CONT#1 that regulates the output voltage and controller CONT#2 that regulates the input voltage are capable of instantaneously responding to output voltage changes. As a result, both controllers can immediately start adjusting the operation of the corresponding converters to the new load current requirement, which minimizes the output voltage transient. Without the coupling, CONT#2 cannot immediately respond to output voltage changes since it can only respond to input voltage changes. As a result, whereas CONVERTER#1 immediately starts adjusting operation to the new load requirement, CONVERTER#2 continues to deliver the same amount of power as before the load change until the difference in the delivered power of the two converters causes input-voltage imbalanced and CONT#2 starts responding. Because of a delayed response of CONT#2, the output voltage transient without coupling is increased and may exceed the specified range.

For example, if the output voltage increases because of a step load current change from heavy load to light load, CONT#1 will immediately sense the output voltage change and will start decreasing the control variable which regulates CONVERTER#1 so that CONVERTER#1 will start immediately reducing the power it delivers to the load. Without the output voltage detector, the control variable of CONVERTER#2 will initially stay unchanged. As a result, CONVERTER#2 will continue to deliver the same power as before the load current change. Because of the power imbalance between the two converters, the input voltages of the converters will become unbalanced, causing controller CONT#2 that controls the input voltage to start adjusting its control variable to the new load condition by reducing the power delivered by converter CONVERTER#2. Because of a delay in controller CONT#2 response, the output voltage transient is increased. With the output voltage detector, the output voltage change is sensed by this circuit and immediately coupled to controller CONT#2 so that both controllers start adjusting their control variables to the new load conditions without a delay. As a result, the output voltage transient response is greatly improved.

Figure 10:
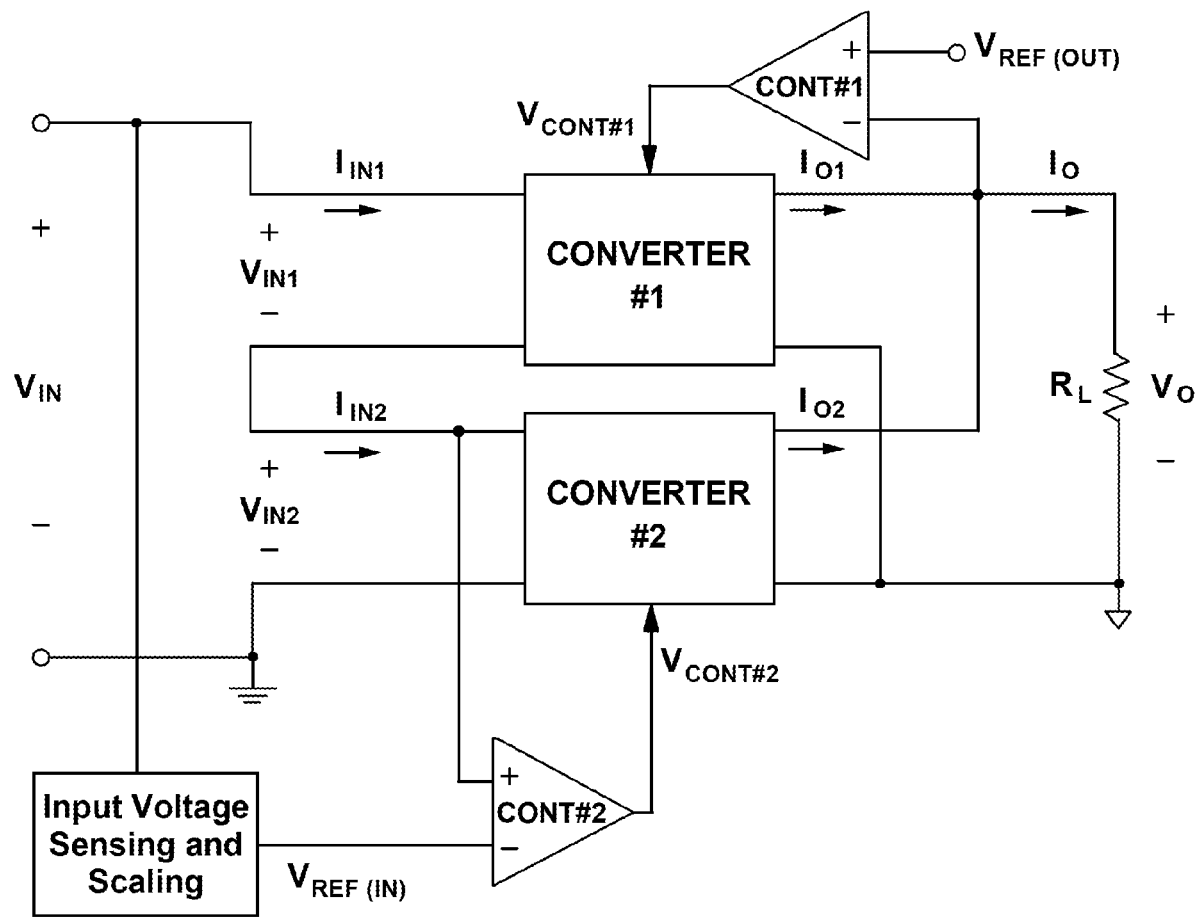
FIG. 10 shows a block diagram of input-voltage balancing with two converters and without rail-splitting capacitors according to an embodiment of the present invention.
Figure 11:
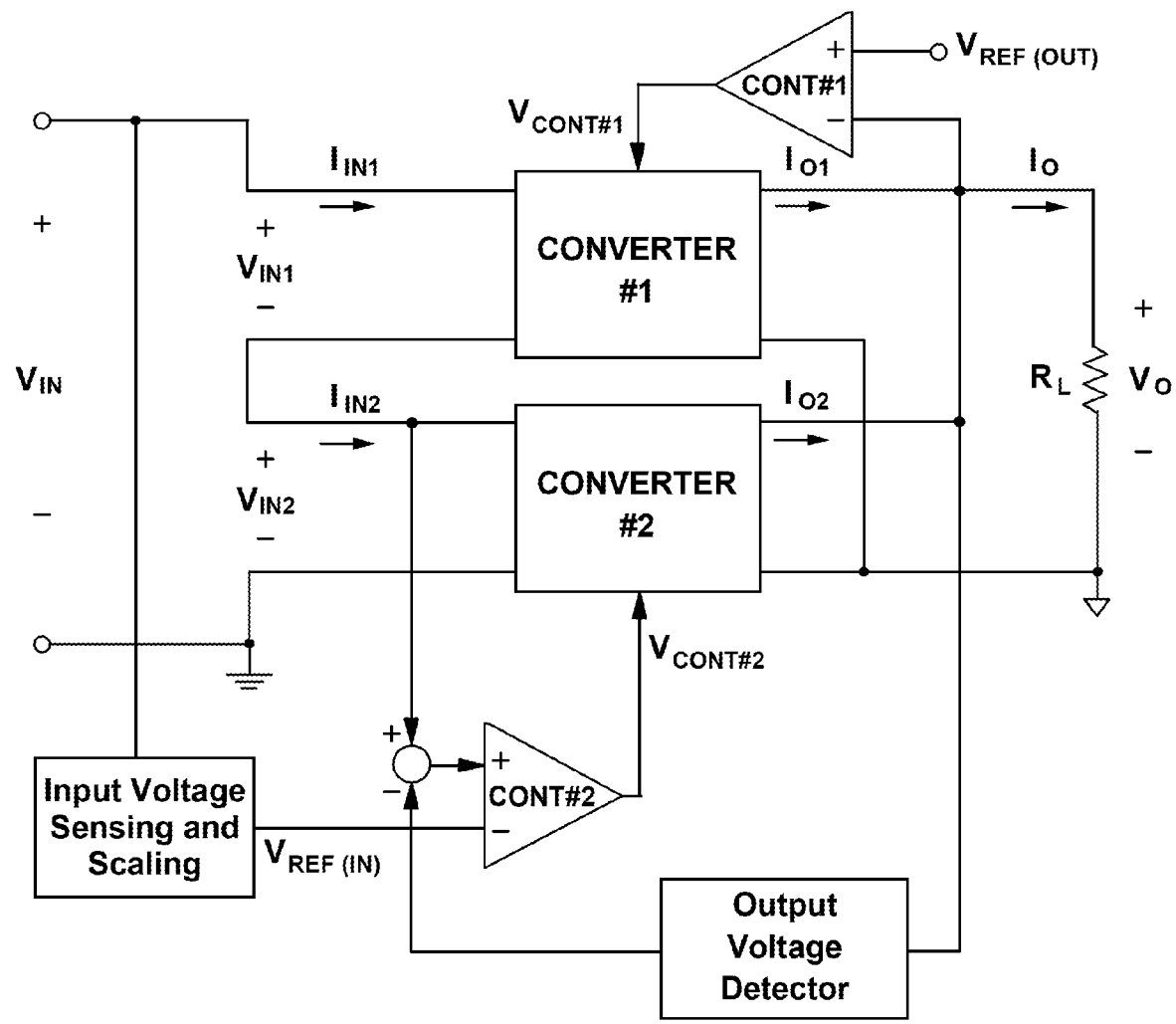
FIG. 11 shows a block diagram of input-voltage balancing with an output voltage detector and two converters according to an embodiment of the present invention.
Figure 12:
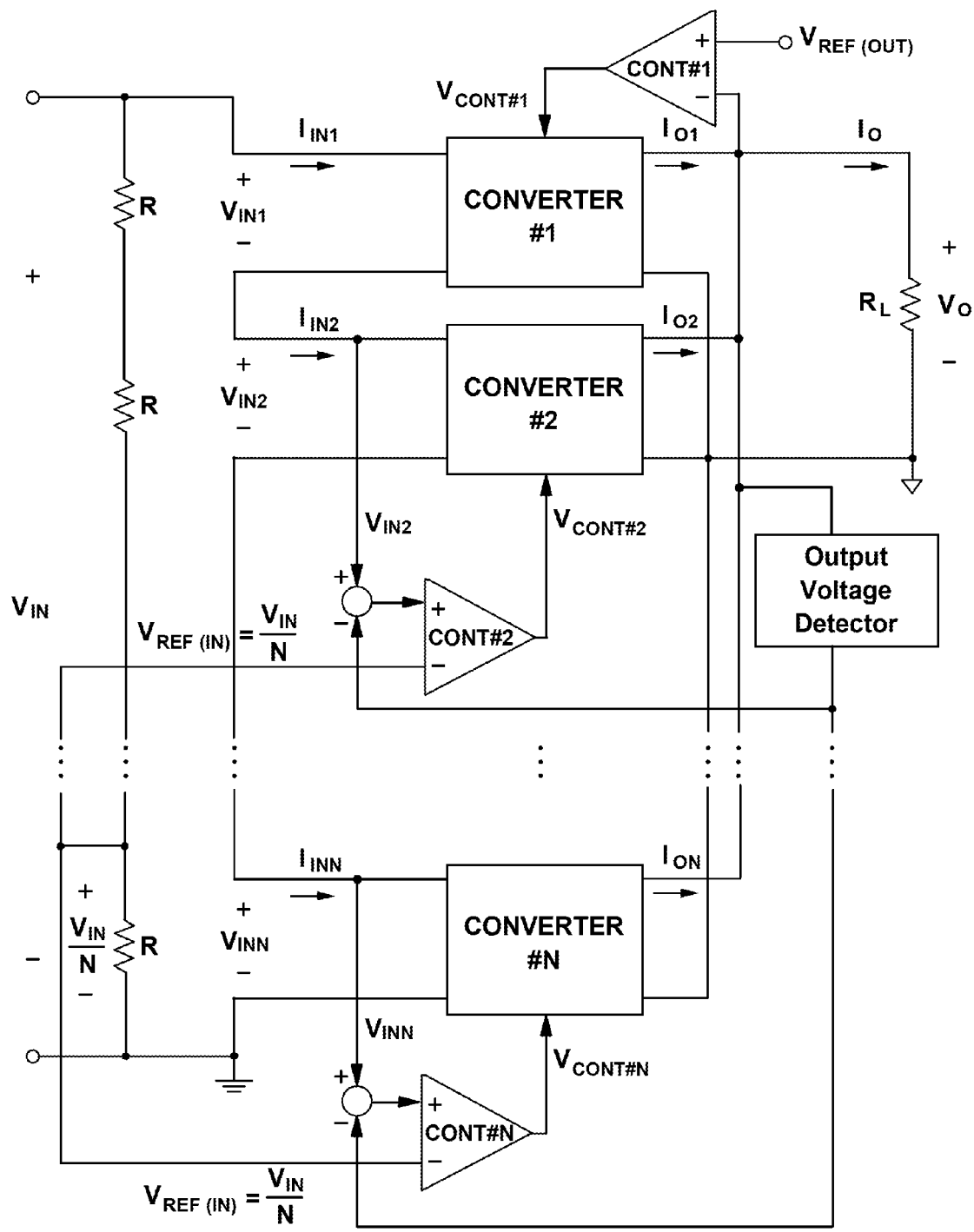
FIG. 12 shows a generalization of a block diagram of input-voltage balancing with an output voltage detector and N converters that have their inputs connected in series, according to another embodiment of the present invention.

It should be noted that the input-voltage-balancing method of this invention does not require that dc/dc converters are connected across rail-splitting capacitors. The input-voltage balancing method of this invention is also applicable to converters that have their inputs connected in series without rail-splitting capacitors, as shown in FIGS. 10, 11, and 12 for two and N converters. The converters in FIGS. 10, 11, and 12 may or may not have internal filter capacitors at their inputs.

Finally, it should be noted that the method can be applied to any converter topology and control method. Specifically, it is applicable to "hard"-switched, "soft"-switched, quasi-resonant, and resonant isolated and non-isolated converter topologies controlled by constant-frequency or variable-frequency control. One topology is an embodiment where a power supply includes a first power conversion stage providing an interim voltage and a second power stage coupled to the interim voltage. The first power conversion stage includes at least one of: power factor correction stage, a battery, a solar cell, a generator, a fuel cell, a flywheel, a DC-DC stage, a single phase or three phase AC-single phase or three phase AC stage, a DC-single phase or three phase AC stage, or a single phase or three phase AC-DC stage. The second power stage includes a plurality of converters and controllers to balance input voltage, for example, as shown in FIG. 5.

What is claimed is:

1. A power supply that is coupled to an input voltage source, comprising:
    a plurality of converters, each converter having an input for receiving an input voltage and an output for providing an output voltage; wherein said inputs are connected in series and said outputs are connected in parallel to provide an output voltage, wherein said serially connected inputs are coupled to the input voltage;
    an output regulating controller coupled to only one of the plurality of converters for regulating the output voltage; and
    one or more input regulating controllers correspondingly coupled to the remaining one or more converters of the plurality of converters, and not to the one converter coupled to the output regulating controller, for regulating one or more input voltages.

2. The power supply of claim 1, wherein the input voltages are substantially equal.

3. The power supply of claim 1, wherein the output voltage regulating controller regulates the output voltage relative to an output reference voltage.

4. The power supply of claim 1, wherein the one or more input voltage regulating controllers regulate the input voltage of their respective converter relative to a corresponding input reference voltage.

5. The power supply of claim 4, wherein the input reference voltages are substantially equal.

6. The power supply of claim 5, wherein the input reference voltages are provided by a voltage divider.

7. The power supply of claim 6, wherein the voltage divider comprises a plurality of series coupled resistors.

8. The power supply of claim 5, wherein the input reference voltages are provided by a digital circuit.

9. The power supply of claim 1, further comprising a delay circuit that delays start-up operation of the converter coupled to the output voltage regulating controller relative to the start-up operation of the remaining converters coupled that to the one or more input voltage regulating controllers.

10. The power supply of claim 1, wherein the input voltage source comprises at least one of AC voltage source or DC voltage source.

11. The power supply of claim 1, wherein the output voltage comprises at least one of AC or DC voltage.

12. The power supply of claim 1, wherein the one or more input voltage regulating controllers are responsive to a change in the output voltage.

13. A power supply, comprising:
    a plurality of converters, each converter having an input for receiving an input voltage and an output for providing an output voltage; wherein said inputs are connected in series and said outputs are connected in parallel to provide an output voltage, wherein said serially connected inputs are coupled to the input voltage;
    an output regulating controller coupled to only one of the plurality of converters for regulating the output voltage;
    one or more input regulating controllers correspondingly coupled to the remaining one or more converters of the plurality of converters, and not to the one converter coupled to the output regulating controller, for regulating one or more input voltages; and
    an output voltage detector that detects a change in the output voltage coupled to the one or more input regulating controllers.

14. The power supply of claim 13, wherein the at least one of the one or more input regulating controllers coupled to the output voltage detector regulates corresponding input voltage based on a detected change in the output voltage.

15. The power supply of claim 14, wherein the output voltage comprises at least one of AC or DC voltage.

16. The power supply of claim 13, wherein the one or more voltage input regulating controllers regulate the input voltage of their respective converter relative to a corresponding input reference voltage.

17. The power supply of claim 13, wherein the output voltage regulating controller regulates the output voltage relative to a corresponding output reference voltage.

18. The power supply of claim 13, further comprising a delay circuit that delays start-up operation of the converter coupled to the output voltage regulating controller relative to the start-up operation of the remaining converters coupled that to the one or more input voltage regulating controllers.

19. The power supply of claim 13, wherein the input voltage comprises at least one of AC or DC voltage source.

20. A power supply, comprising:
    a first power conversion stage providing an interim voltage; and
    a second power stage coupled to the interim voltage comprising:
        a plurality of converters, each converter having an input for receiving an input voltage and an output for providing an output voltage; wherein said inputs are connected in series and said outputs are connected in parallel to provide an output voltage, wherein said serially connected inputs are coupled to the interim voltage;
        an output regulating controller coupled to only one of the plurality of converters for regulating the output voltage; and
        one or more input regulating controllers correspondingly coupled to the remaining one or more converters of the plurality of converters, and not to the one converter coupled to the output regulating controller, for regulating one or more input voltages.

21. The power supply of claim 20, wherein the first power conversion stage comprises at least one of:
- power factor correction stage;
- a battery;
- a solar cell;
- a generator;
- a fuel cell;
- a flywheel;
- a DC-DC stage;
- a single phase or three phase AC-single phase or three phase AC stage;
- a DC-single phase or three phase AC stage; or a single phase or three phase AC-DC stage.

* * * * *